US011843514B2

(12) United States Patent
Kalte et al.

(10) Patent No.: US 11,843,514 B2
(45) Date of Patent: Dec. 12, 2023

(54) COMPUTER-IMPLEMENTED METHOD FOR RESTRUCTURING A PREDEFINED DISTRIBUTED REAL-TIME SIMULATION NETWORK

(71) Applicant: dSPACE digital signal processing and control engineering GmbH, Paderborn (DE)

(72) Inventors: Heiko Kalte, Paderborn (DE); Dominik Lubeley, Paderborn (DE)

(73) Assignee: dSPACE GmbH, Paderborn (DE)

( * ) Notice: Subject to any disclaimer, the term of this patent is extended or adjusted under 35 U.S.C. 154(b) by 13 days.

(21) Appl. No.: 17/518,288

(22) Filed: Nov. 3, 2021

(65) Prior Publication Data

US 2022/0060389 A1 Feb. 24, 2022

Related U.S. Application Data

(63) Continuation of application No. PCT/EP2020/055414, filed on Mar. 2, 2020.

(30) Foreign Application Priority Data

May 7, 2019 (DE) ..................... 10 2019 111 790.9

(51) Int. Cl.
*H04L 41/14* (2022.01)
*H04L 41/12* (2022.01)
*H04L 43/50* (2022.01)

(52) U.S. Cl.
CPC ............ *H04L 41/145* (2013.01); *H04L 41/12* (2013.01); *H04L 43/50* (2013.01)

(58) Field of Classification Search
CPC ........ H04L 41/145; H04L 41/12; H04L 43/50
(Continued)

(56) References Cited

U.S. PATENT DOCUMENTS 7,774,440 B1 8/2010 Bagrodia et al.
9,633,144 B2 4/2017 Brehm et al.
(Continued)

FOREIGN PATENT DOCUMENTS

CN 106161102 A 11/2016
EP 2770434 A1 8/2014

OTHER PUBLICATIONS

Himmler; "Hardware-in-the-loop Technology Enabling Flexible Testing Processes" 51$^{st}$ AIAA Aerospace Sciences Meeting Including the New Horizons Forum and Aerospace Exposition; Jan. 7, 2013.

(Continued)

*Primary Examiner* — Zi Ye
*Assistant Examiner* — Zia Khurshid
(74) *Attorney, Agent, or Firm* — Muncy, Geissler, Olds & Lowe, P.C.

(57) ABSTRACT

A computer-implemented method for restructuring a predefined distributed real-time simulation network, wherein the simulation network has a plurality of network nodes and a plurality of data connections, wherein each network node has at least one data connection interface for connecting a data connection, wherein the network nodes are at least partially in communication via the data connections, and wherein during operation of the simulation network a simulation application is executed on at least one network node. The method permits a structure for the real-time simulation network to be automatically found in which the critical communication connections are reduced and avoided as much as possible by determining the topology of the simulation network so that topology information concerning the network nodes and the data connections between the network nodes is available by determining expected values for (Continued)

node data rates or node latencies for the network nodes of the simulation network.

18 Claims, 8 Drawing Sheets

(58) Field of Classification Search
USPC .......................................................... 709/224
See application file for complete search history.

(56) References Cited

U.S. PATENT DOCUMENTS

| | | |
|---|---|---|
| 2013/0297769 A1 | 11/2013 | Chang et al. |
| 2013/0343207 A1* | 12/2013 | Cook ................ H04L 43/0852 370/252 |
| 2018/0109424 A1 | 4/2018 | Krishnaswamy et al. |
| 2018/0212836 A1* | 7/2018 | Zhao .................... H04L 43/0888 |
| 2018/0219738 A1 | 8/2018 | Bainbridge et al. |

OTHER PUBLICATIONS

Anonymous; Network planning and design—Wikipedia—Apr. 6, 2019.
Lassila et al; Dimensioning of data networks: a flow-level perspective; European Transactions of Telecommunications, Wiley & Sons Oct. 1, 2009.
Adewole et al; Co-simulation platform for integrated real-time power system emulation and wide area communication Sep. 6, 2016.
International Search Report dated Jun. 18, 2020 in corresponding application PCT/EP2020/055414.
German Search Report dated Feb. 26, 2020 in corresponding application 10 2019 111 790.9.

* cited by examiner

| | E-KDR | E-KL | E-DVDR | KV1 | KV2 | ... | KV8 | KV9 | G-DVDR | BS | U1 | U2 |
|---|---|---|---|---|---|---|---|---|---|---|---|---|
| RK1 | 2 Gbps | 10 μs | - | | | | | | | ✓ | | |
| DV0 | - | - | 4 Gbps | | | | | | 10 Gbps | ✓ | | |
| DV1 | - | - | 1,4 Gbps | | | | | | 1,2 Gbps | 4 | 2,5 Gbps | |
| RK2 | 2 Gbps | 50μs | - | E-KVDR = 4 Gbps | E-KVDR = 1,4 Gbps | E-KVDR = ... | E-KVDR = 600 Mbps | E-KVDR = 600 Mbps | | ✓ | | |
| DV2 | - | - | 1,4 Gbps | E-KVL = 60 μs | E-KVL = 350 μs | E-KVL = ... | E-KVL = 390 μs | E-KVL = 390 μs | 1,2 Gbps | 4 | 2,5 Gbps | |
| DV3 | - | - | 600 Mbps | | | | | | 1,2 Gbps | ✓ | | |
| R1 | 1,5 Gbps | 90μs | - | | | | | | | ✓ | | |
| DV4 | - | - | 400 Mbps | G-KVDR = 5 Gbps | G-KVDR = 1,2 Gbps | G-KVDR = ... | G-KVDR = 1,2 Gbps | G-KVDR = 1,2 Gbps | 1,2 Gbps | ✓ | | |
| DV5 | - | - | 500 Mbps | G-KVL = 100 μs | G-KVL = 1 ms | G-KVL = ... | G-KVL = 800 μs | G-KVL = 800 μs | 1,2 Gbps | ✓ | | |
| DV6 | - | - | 500 Mbps | | | | | | | ✓ | | |
| IO1 | 400 Mbps | 250μs | - | BS ✓ | BS 4 | BS ... | BS ✓ | BS ✓ | | ✓ | | 400 Mbps |
| IO2 | 500 Mbps | 450μs | - | | | | | | 1,2 Gbps | ✓ | | 400 Mbps |
| IO3 | 500 Mbps | 450μs | - | | | | | | 1,2 Gbps | ✓ | | |
| R2 | 1,5 Gbps | 90μs | - | | | | | | | ✓ | | |
| DV7 | - | - | 300 Mbps | | | | | | | ✓ | | |
| DV8 | - | - | 300 Mbps | | | | | | | ✓ | | |
| IO4 | 300 Mbps | 250μs | - | | | | | | | ✓ | | |
| IO5 | 300 Mbps | 250μs | - | | | | | | | ✓ | | |

Fig. 4

| | E-KDR | E-KL | E-DVDR | KV1 | KV2 | KV3 | KV5 | KV6 | G-DVDR | BS | U1 | U2 |
|---|---|---|---|---|---|---|---|---|---|---|---|---|
| RK1 | 250 kbps | 100 μs | - | | | | | | | ✓ | | |
| DV0 | - | - | 950 kbps | | | | | | 10 Gbps | ✓ | | |
| DV1 | - | - | 110 Mbps | | | | | | 1,2 Gbps | ✓ | | |
| RK2 | 700 kbps | 350μs | - | E-KVDR = 950 kbps | E-KVDR = 110 Mbps | E-KVDR = 465 Mbps | E-KVDR = 170 Mbps | E-KVDR = 170 Mbps | | | | |
| DV2 | - | - | 465 Mbps | | | | | | 1,2 Gbps | ✓ | | |
| DV3 | - | - | 170 Mbps | | | | | | 1,2 Gbps | ✓ | | |
| R1 | 575 Mbps | 90μs | - | E-KVL = 450 μs | E-KVL = 440 μs | E-KVL = 890 μs | E-KVL = 690 μs | E-KVL = 690 μs | | | | |
| DV4 | - | - | 110 Mbps | | | | | | 1,2 Gbps | ✓ | | |
| DV5 | - | - | 220 Mbps | | | | | | 1,2 Gbps | ✓ | | |
| DV6 | - | - | 245 Mbps | | | | | | 1,2 Gbps | ✓ | | |
| IO1 | 110 Mbps | 250μs | - | G-KVDR = 2 Gbps | G-KVDR = 1,2 Gbps | G-KVDR = 350 Mbps | G-KVDR = 1,2 Gbps | G-KVDR = 1,2 Gbps | | ✓ | | |
| IO2 | 220 Mbps | 450μs | - | G-KVL = 490 μs | G-KVL = 1 ms | G-KVL = 1 ms | G-KVL = 800 μs | G-KVL = 800 μs | | ↯ | 16 bit → 12 bit | |
| IO3 | 245 Mbps | 450μs | - | BS ✓ | BS ✓ | BS ↯ | BS ✓ | BS ✓ | | ↯ | 16 bit → 12 bit | IO3 via R2 |
| R2 | 170 Mbps | 90μs | - | | | | | | | ✓ | | |
| DV7 | - | - | 80 Mbps | | | | | | 1,2 Gbps | ✓ | | |
| DV8 | - | - | 90 Mbps | | | | | | 1,2 Gbps | ✓ | | |
| IO4 | 80 Mbps | 250μs | - | | | | | | | ✓ | | |
| IO5 | 90 Mbps | 250μs | - | | | | | | | ✓ | | |

| | E-KDR | E-KL | E-DVDR | KV1 | KV2 | KV3 | KV5 | KV6 | G-DVDR | BS | U1 | U2 |
|---|---|---|---|---|---|---|---|---|---|---|---|---|
| RK1 | 252 kbps | 112 μs | | | | | | | | ✓ | | |
| DV0 | - | - | 960 kbps | | | | | | 10 Gbps | ✓ | | |
| DV1 | - | - | 122 Mbps | | | | | | 1,2 Gbps | ✓ | | |
| RK2 | 708 kbps | 357 μs | | E-KVDR = | E-KVDR = | E-KVDR = | E-KVDR = | E-KVDR = | | | | |
| DV2 | - | - | 465 Mbps | 966 kbps | 116 Mbps | 469 Mbps | 183 Mbps | 189 Mbps | | ✓ | | |
| DV3 | - | - | 178 Mbps | E-KVL = 478 μs | E-KVL = 459 μs | E-KVL = 903 μs | E-KVL = 719 μs | E-KVL = 738 μs | | | | |
| R1 | 575 Mbps | 87 μs | - | | | | | | | ✓ | | |
| DV4 | - | - | 122 Mbps | | | | | | | ✓ | | |
| DV5 | - | - | 220 Mbps | G-KVDR = 2 Gbps | G-KVDR = 1,2 Gbps | G-KVDR = 350 Mbps | G-KVDR = 1,2 Gbps | G-KVDR = 1,2 Gbps | | ✓ | | |
| DV6 | - | - | 245 Mbps | G-KVL = 490 μs | G-KVL = 1 ms | G-KVL = 1 ms | G-KVL = 800 μs | G-KVL = 800 μs | | ✓ | | |
| IO1 | 122 Mbps | 114 μs | | BS ✓ | BS ✓ | BS ↯ | BS ✓ | BS ✓ | | ↯ | 16 bit → 12 bit | |
| IO2 | 220 Mbps | 456 μs | | | | | | | | | | |
| IO3 | 245 Mbps | 457 μs | | | | | | | | ↯ | 16 bit → 12 bit | IO3 via R2 |
| R2 | 170 Mbps | 89 μs | - | | | | | | | ✓ | | |
| DV7 | - | - | 84 Mbps | | | | | | 1,2 Gbps | ✓ | | |
| DV8 | - | - | 94 Mbps | | | | | | 1,2 Gbps | ✓ | | |
| IO4 | 84 Mbps | 261 μs | - | | | | | | | ✓ | | |
| IO5 | 94 Mbps | 262 μs | - | | | | | | | ✓ | | |

COMPUTER-IMPLEMENTED METHOD FOR RESTRUCTURING A PREDEFINED DISTRIBUTED REAL-TIME SIMULATION NETWORK

This nonprovisional application is a continuation of International Application No. PCT/EP2020/055414, which was filed on Mar. 2, 2020, and which claims priority to German Patent Application No. 10 2019 111 790.9, which was filed in Germany on May 7, 2019, and which are both herein incorporated by reference.

BACKGROUND OF THE INVENTION

Field of the Invention

The present invention relates to a computer-implemented method for restructuring a predefined distributed real-time simulation network, wherein the simulation network has a plurality of network nodes and a plurality of data connections, wherein each network node has at least one data connection interface for the connection of a data connection, with the network nodes being at least partially in a communication connection via the data connections, and wherein a simulation application is executed on at least one network node during operation of the simulation network.

The invention relates to the field of controller development, in particular to the development of controllers such as those used in large numbers in the automotive sector, but also in the aerospace industry and for controlling other technical processes. Nowadays, such controllers mostly include small computers with an I/O interface (I/O=input/output), which are often equipped with a real-time operating system that allows for the realization of mostly—even complex—control tasks on the controller. The development of controllers is a central component in the technical development of extensive device-related systems, as they are known from industrial practice, for example and primarily from the technical fields mentioned above.

DESCRIPTION OF THE BACKGROUND ART

The test of a series ECU used in the final product is the end point of a plurality of preceding development stages for a controller application (usually a closed-loop or open-loop control system) to be implemented on the controller, wherein these development stages are usually described using the so-called V model or V cycle. For this purpose, the aforementioned distributed real-time simulation networks are required. At the beginning of the application development, which is essential for the function of many technical systems, is the mathematical modeling of, for example, a control algorithm on a computer with a mathematical-graphical modeling environment, wherein the controller is considered to be a component of the controller. In addition, the environment of the controller is mathematically modeled since the interaction of the controller on the controller with the process to be controlled is of interest. In this functional mathematical examination, a simulation in real time is usually not necessary (offline simulation).

In the next step, using rapid control prototyping (RCP), the previously designed control algorithm is transferred to a high-performance, mostly real-time capable hardware that can be connected via suitable I/O interfaces with the actual physical process, for example with a motor vehicle engine. As a rule, this real-time capable hardware has nothing to do with the series ECU that will be used later; here, it is about demonstrating the overall functionality of the previously designed control in practice.

In a further step, as part of the automatic production code generation, the control is implemented on the target processor that is likely to be used later in the series ECU. In this step, the target hardware approximates the series ECU, but is not identical to the series ECU. In a further step, the series ECU, which is usually only available at a late stage of development, is tested as part of a hardware-in-the-loop (HIL) test. Here, the series ECU physically present in this step is connected to a powerful simulator via a physical ECU interface. The simulator simulates the required variables of the series ECU under test and exchanges input and output variables with the series ECU.

The series ECU tested in this way as part of the HIL simulation is ultimately installed in the "real" target system, for example in a motor vehicle, and tested in the real physical environment, which was previously only simulated in the simulation environment.

It is plausible that in order to realize the various development stages, whether as rapid control prototyping or as hardware-in-the-loop simulation, powerful real-time hardware must be available, which as a rule forms a distributed real-time simulation network that has several network nodes and several data connections. The network nodes can, for example, be compute nodes, i.e., small computers with a real-time operating system. They can also be I/O nodes, with which, for example, measurement data from a physical process is acquired and which then pass on digitized values in the form of data packets to the simulation network, or which also output analog control signals in order to influence a physical process, for example by controlling an actuator. The network nodes also include communication nodes, which are often connected to at least two other nodes, and which are used less for signal generation or processing than for signal conversion (e.g., conversion of data to a specific protocol) or which serve to serialize parallel data streams (routers), etc.

The network nodes have at least one data connection interface, via which they are physically connected to at least one other network node by means of a data connection. The network nodes are at least partially in communication with each other via the data connection, wherein a communication connection, if it runs over several network nodes, can comprise several data connections. Not every node must necessarily exchange data with every other node, even if this were physically possible due to the physical design of the simulation network. The network nodes—to simplify, also referred to as nodes—of a distributed real-time simulation network are often not very far apart from each other but can be accommodated, for example, even in a common simulator housing. Here, "distributed" means that the network nodes exchange information over a data connection and usually cannot do this by accessing a shared memory. Since the real-time simulation network is generally connected to a real physical process, real-time capability is an important property. When in the following, partly for reasons of simplicity, only a simulation network is mentioned, a real-time simulation network is always meant.

During operation of the simulation network, a simulation application is executed on at least one network node. This will typically take place on one compute node, using a real-time operating system so that a closed-loop sampling system can be implemented. Digital sampling systems require calculations to be reliably performed and thus also completed in a certain fixed periodic interval. For example, in the case of highly dynamic control systems, it may be necessary to perform a full calculation interval of the simulation application or a task—i.e., a partial functionality—of the simulation application in one microsecond. For this purpose, via the data connections of the simulation network, corresponding measurement data from I/O network nodes must be sent in a microsecond interval to the network node executing the simulation application. Accordingly, in this time interval, corresponding control variables must also be calculated by the network node which executes the simulation application and forwarded to an I/O network node. It may be that a simulation application running on a network node has several tasks that have to be executed at different calculation intervals.

A simulation application is understood here to be an algorithm that is executed on a network node. It may well be that an overall control task is distributed over a number of nodes for computation, so that each of these multiple computational network nodes executes a simulation application, with the various simulation applications together making up the overall functionality to be achieved.

In the RCP use case, the real-time simulation network is used to simulate the ECU under test, wherein the simulation network is then connected to the actual process to be controlled, namely via the I/O network nodes. In the case of HIL simulation, the real-time simulation network is used to simulate the environment of a practically fully developed series ECU, wherein the real-time simulation network is in turn physically connected to the series ECU via I/O compute nodes. In any case, the real-time simulation network is connected to a real technical-physical process via I/O interfaces of certain network nodes and acts on this technical-physical process during operation.

In practice, designing such a described real-time simulation network is challenging, since the data connections and the communication connections implemented in the simulation network have to be chosen in such a way that the actually achieved data transfer rates do not exceed the channel capacities, i.e., the maximum achievable data transfer rates on a communication path. It can happen very quickly that the communication volume in such a real-time simulation network is not well balanced, certain communication connections are operated at the limit of—or even beyond—their data capacity, while other data connections are underutilized. The same applies to delay times, also known as latency, which have to be accepted in certain communication connections. If the design of the simulation network is not optimal, only very large latencies can be realized via certain communication connections, whereas on other communication connections the latencies are very low, so that here, too, a better distribution of the data streams or a better selection of the communication connections would be beneficial. Designing the described real-time simulation networks requires application engineers with a high level of experience. The goal is to utilize the existing resources of the simulation network as fully as possible since unused resources in the form of idle hardware can be associated with considerable costs. The restructuring of simulation networks according to the principle of "trial and error" is ineffective and error-prone.

SUMMARY OF THE INVENTION

Therefore, the object of the present invention is to specify a systematic and computer-implementable method for restructuring a real-time simulation network for controller development, with which a structure for the real-time simulation network can be found in which critical communication connections are reduced and avoided as far as possible.

The method according to the invention, in which the object previously derived and shown is achieved, is first characterized by the fact that the topology of the simulation network is acquired, so that topology information is available about the network nodes and the data connections between the network nodes. This method step serves to precisely capture the topology of the specified real-time simulation network.

Then, for the network nodes of the simulation network, expected values are determined for node data rates and/or node latencies. Expected values for the data transfer rates are also determined for the data connections. These various expected values are assumptions concerning the possible node data rates, node latencies and/or data transfer rates on the data connections. Furthermore, the communication connections between the network nodes of the simulation network are determined. The above method steps can be performed in different orders.

Now, for the determined communication connections, the expected values for communication connection data rates and/or communication connection latencies are determined, based on the expected values for the node data rates and/or the node latencies and/or the data transfer rates of the network nodes and data connections involved in the communication connection. Since the communication connections within the simulation network represent the actually used data transfer paths between network nodes, i.e., via which communication takes place, the communication connection data rates and the communication connection latencies are thus the main parameters of interest within the simulation network.

In addition, limit values are determined for the communication connections for the communication connection data rates and/or for the communication connection latencies. Limit values for the data transfer rates are determined for the data connection. These limit values are values for the data rates or latencies of the communication connections and values for the data transfer rates on the data connections that are still considered acceptable. The limit value for the data transfer rate can, for example, be the channel capacity, i.e., the maximum possible data transfer rate of the communication connection or of a part of the communication connection or also a percentage of it, if certain capacities are to be included for good measure. A limit value for the data transfer rates can also result from a comparison of the expected values for the data transfer rates or from a mean value formed therefrom, if it is required that the data transfer rates on different communication connections are to deviate from each other only to a certain degree. For the realization of the general idea of the invention, the exact method of determining the different expected values and the different limit values for the communication connection data rates, the communication connection latencies and the data transfer rates is not decisive; what is decisive is that the expected values and limit values are first of all determined, no matter the details.

In a subsequent evaluation step, critical communication connections are determined by comparing the determined expected values for the communication connection data rates and/or communication connection latencies and/or data transfer rates with the limit values for the communication connection data rates and/or for the communication connection latencies and/or for the data transfer rates of the corresponding communication connections. The comparison of expected values and the corresponding limit values on the different communication connections thus result in an assessment of which communication connections are to be rated as critical. The evaluation is performed by a numerical algorithm, which can be defined very simply but also very complexly. One rule could be, for example, that an approximation of the expected value of the data transfer rate to the limit value of the data transfer rate beyond a certain proportion—for example beyond 80%—could lead to the communication connection being rated as critical. A similar approach can be taken with the latencies, namely that an approximation of the expected value for a communication connection latency to the limit value for the corresponding communication connection latency above a certain proportion—for example 80%—also leads to the communication connection being assessed as critical.

Finally, in a restructuring step, the predefined simulation network is restructured in such a way that critical communication connections are reduced. Restructuring of the simulation network means, for example, that new data connections are created between communicating network nodes, if necessary, existing data connections are removed, that functionalities of network nodes are distributed differently, that simulation applications are moved to other network nodes or simulation applications are split and distributed to different network nodes, that network nodes where many communication paths converge can be relieved by implementing alternative communication paths by means of the simulation network, etc.

The method described above for restructuring a predefined distributed real-time simulation network can also be carried out iteratively so as to gradually achieve an improved and more uniformly utilized simulation network.

By implementing the described method, it is possible to use the resources of a real-time simulation network as efficiently as possible, since—in part—overdimensioning can be avoided and a uniform utilization of the simulation network can be encouraged.

Depending on the technical realization of the simulation network, the restructuring can take place completely automatically. This can be realized particularly easily, for example, when the initial situation of the real-time simulation network is provided as a fully meshed structure in which practically every network node is connected to every other network node via a data connection, at least as far as this is technically feasible. For example, it may not make much sense to interconnect I/O network nodes with data connections, whereas it may be useful to interconnect all of the compute network nodes. In the course of carrying out the method, data connections within the real-time simulation network can then be dropped, so that the simulation network is thinned out with regard to the data connections. Such restructuring can be irreversible, for example when using fuse or antifuse technology, as found in one-time programmable FPGAs (Field Programmable Gate Array). The restructuring can also have a reversible character, e.g., by using multiple programmable structures, such as multiple configurable FPGAs.

However, restructuring can also be carried out manually in some cases, with the restructuring information resulting entirely from the automated evaluation step. The restructuring, i.e., the removal of data connections, the installation of simulation applications, the installation of communication connections, etc., can then be carried out manually to some extent. However, the exact instructions as to which measures are to be taken result fully automatically from the execution of the computer-implemented method. In an exemplary embodiment of the computer-implemented method, in order to reduce latencies on a communication connection in which prior to a restructuring step one or more communication network nodes, e.g., routers, are traversed between a computational network node and an I/O network node, it is provided in particular that a restructuring step is specified by the method in such a way that, after completion of the restructuring step, a data connection with a reduced number of communication network nodes (e.g., routers) or a data connection with no communication network nodes is present. After one of the two last-mentioned restructuring steps, in a data transfer from the I/O network node to its corresponding compute network node, for example, a reduced or no transfer latency, which can be assigned to one or more communication network nodes, can be determined. In a preferred embodiment of the method, it is provided that the topology of the simulation network is obtained by calling up information services implemented on the nodes of the simulation network, which, when called, provide information concerning the nodes to which they are directly connected, in particular about to which nodes they are directly connected and via which data connections. These information services can be very rudimentary and provide appropriate connection information to the calling point. If it is known for each network node with which other network node this is connected, then the topology of the real-time simulation network can be easily and unambiguously determined. Alternatively, it is provided that the topology of the simulation network can be obtained by reading in a file with the topology information of the predefined simulation network.

in the restructuring step, the critical communication connections in the predetermined simulation network can be reduced in that in the predetermined simulation network, and at least by partially maintaining the topology of the simulation network, the network nodes are functionally extended and/or functionally reduced, and/or in that the data connections are functionally extended and/or functionally reduced, and/or in that communication connections between network nodes are routed differently. The functional extension or functional reduction of the network nodes can be achieved, for example, by varying the way simulation applications are distributed between network nodes. Another way of reducing the functionality of a network node can be to reduce the data rate at which information is to be transferred, for example. It is also possible, for example, to reduce the resolution of the values to be transferred, so that the bit length of the information to be transferred is reduced as a result. Another possibility is, for example, lossless data compression, although it must be taken into account here that this can lead to greater latency of a network node. The functional extension or reduction of data connections can be achieved by using other transfer media with varying channel capacities.

The reduction of critical communication connections in the predefined simulation network can be achieved alternatively or additionally by extending the predefined simulation network by at least one additional network node and by at least one additional data connection and/or by reducing it by at least one existing network node and by at least one existing data connection, at least in part by modifying the simulation network.

The expected values for the data transfer rates of the data connections can be obtained by summing up the data rates of the connected network nodes. The data rates of the connected network nodes can be obtained in different ways, which will be explained below.

The channel capacities of the data connections can be used as limit values for the data transfer rates of the data connections, i.e., as the maximum data transfer rates that are possible with the data connections.

In the following, three example variants are presented, which differ in the way of determining the expected values for the node data rates and/or for the node latencies of the network nodes and/or of determining the expected values for the data transfer rates of the data connections.

According to a first variant, it is provided that the expected values for the node data rates and/or the node latencies for the network nodes of the simulation network are determined on the basis of the hardware specifications of the network nodes of the simulation network, in particular without taking into account any simulation applications of the respective network node, in particular without taking into account any hardware parameters of the respective network node. Hereby, only comparatively rough estimations for the mentioned expected values are possible. In particular, it is not taken into account which simulation applications with how many different tasks and with which sampling times are calculated, with which frequency data is recorded and/or over which channels data is sent and how, for example, I/O network nodes are parameterized (sampling rate, resolution). Therefore, this variant of determining the expected values is suitable for determining worst-case expected values for the node data rates and/or the node latencies for the network nodes of the simulation network by using maximum values of the node data rates and/or of the node latencies for the expected values for the node data rates and/or the node latencies. In any case, this leads to the conclusion as to whether the design of the real-time simulation network is functional or not, even under very unfavorable assumed conditions.

From a plurality of known real-time simulation networks configured to operate, mean values for actual node data rates and/or node latencies for the network nodes of the simulation network can be calculated and these mean values can be selected as expected values for the node data rates and/or the node latencies for the network nodes of the simulation network. With this embodiment of the first variant for determining expected values, no application-specific information is used, i.e., no information relating to the operation of the specific predefined real-time simulation network is used, but rather only hardware information concerning the simulation network. However, empirical values from other simulation networks are used, which have the same network nodes. This requires that corresponding information concerning real-time simulation networks configured to operate is available. In one embodiment variant of the computer-implemented method, for example, it is provided to use the above-mentioned empirical values, which comprise an application-specific call rate of aperiodic tasks and/or comprise an application-specific processing duration of aperiodic tasks, to determine an/several empirical value(s).

According to a second variant for determining the expected values for the node data rates and/or the node latencies for the network nodes of the simulation network, these expected values are determined taking into account the simulation applications of the respective network nodes, in particular taking into account any hardware parameterizations of the network nodes. For implementing this method, it is not necessary to also execute the simulation applications, it is only important that the knowledge about relevant parameters of the simulation applications and/or the hardware parameterizations is available.

The expected values for the node data rates and/or the node latencies for the network nodes can be determined by taking into account the calculation interval of periodic tasks and/or assumed call rates and processing times of aperiodic tasks, the size of calculated and sent data packets in tasks, and the configuration of I/O functions, in particular the call rate and the size of processed I/O data packets.

Periodic tasks are functions within simulation applications, which are executed at a certain constant time interval, the calculation interval. This is necessary, for example, when numerical methods for solving equations—also differential equations—are performed within the frame of such a periodic task. Such a calculation interval is typically in the range of milliseconds, but for demanding, very dynamic tasks, the calculation interval can presently also be in the range of microseconds. While the periodic tasks are driven by a fixed time interval, the aperiodic tasks are triggered by influences that do not lie in a predictable time interval, but are triggered, for example, by external influences. In practical terms, such tasks—i.e., functions within a simulation application—are connected to an interrupt and then executed on demand, i.e., event-driven or aperiodically. Since it is not readily predictable how often such aperiodic tasks will be called, this embodiment of the method uses assumed call rates.

Likewise, the size of the data packets sent during the execution of a—periodic or aperiodic—task is taken into account, since this is just as decisive for the resulting data transfer rate, which is caused by a network node, and which is consequently transferred via a data connection and then accordingly also via a communication connection. Network nodes implemented as I/O network nodes usually do not perform a freely programmable simulation application, but rather an I/O functionality determined by the capabilities of the hardware, for example an analog/digital conversion, which can, however, be parameterized within certain limits. For example, I/O network nodes can often be specified by parameterization with respect to which rate they use to acquire and/or output data and with respect to the numerical resolution with which this is done, which influences the size of the processed I/O data packets.

This second variation for the determination of expected values is generally considerably more precise than working purely with hardware specifications of network nodes and data connections. However, it does not take into account— and cannot take into account—possible delays that tend to occur in real simulation networks. For example, collisions between data transfers of different network nodes, which use one and the same data connection, can occur. This can mean that a data packet intended to be sent by a network node has to be resent with a certain time delay, resulting in latencies that cannot be taken into account in a purely theoretical consideration, e.g., according to the second variant of the determination of expected values.

In order to also take these effects into account, a third variant for determining the expected values for the node data rates and/or for the node latencies for the network nodes and/or the expected values for the data transfer rates of the data connections of the simulation network is provided in order to determine these expected values by measurements in the simulation network. In a preferred embodiment, the expected values for the communication connection data rates and/or the communication connection latencies are determined by measuring during the operation of the simulation network, which requires that the simulation applications be executed on the corresponding network node during measurement.

In order to measure the expected values for the communication connection latencies, it is provided that a synchronous time can be set for the network nodes of the simulation network. Each sending network node sends the data item it sends, i.e., the data packet it sends, with a dispatch time stamp. The last receiving network node in the communication connection can then determine the expected value for the communication connection latency of the corresponding communication connection from the receive time of the received data item or data packet, and by evaluating the dispatch time stamp. Since this is done when the simulation applications are run on the network node, additional time delays during the real operation of the simulation network—e.g., due to collisions on the communication connections—are also taken into account.

Alternatively, the expected values for the communication connection latencies can be measured by setting up a synchronous time for all network nodes of the simulation network, and by implementing an echo function in the network nodes of the simulation network. In the field of data transfers, such an echo function is also known per se under the term "ping". The expected values for the communication connection latencies are then measured in that the network node receiving during operation of the simulation network or the sending network node of a communication connection sends an echo request to the network node respectively sending during operation of the simulation network or to the receiving network node of this same communication connection, and in that the network node sending the echo request determines the echo round-trip time after receiving the echo signal and determines the expected value for the communication connection latency therefrom. This measurement can be carried out in particular if the simulation network is not operated during the echo process, i.e., if the simulation applications are not run on the network node. Alternatively, it is also possible to operate the simulation network during the execution of the echo process, i.e., to run the simulation applications on the network node.

The method can be executed on a computer connected to the simulation network via a data connection, or that the method is executed on a network node of the simulation network designed as a compute node.

The previously derived problem is also solved by a computer program product comprising commands which, when the program is executed by a computer, cause the computer to perform the method according to the foregoing description. Likewise, the derived problem is solved by a computer-readable storage medium comprising commands which, when the program is executed by a computer, cause the computer to execute the method in accordance with the description described above. When a computer is mentioned here, it can be—as already explained above—a computer that is connected to the simulation network via a data connection, or it can also be a network node of the simulation network that is designed as a compute node.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a tabular display of the first variant of the method for restructuring the simulation network according to FIG. 3, FIG. 6 is a tabular display of the second variant of the method for restructuring the simulation network according to FIG. 5, FIG. 8 is a tabular display of the third variant of the method for restructuring the simulation network according to FIG. 7.

DETAILED DESCRIPTION

The figures describe a computer-implemented method 1 for restructuring U a predefined distributed real-time simulation network 2, hereinafter also referred to simply as "simulation network", as those used for the development of ECUs.

Figure 1:
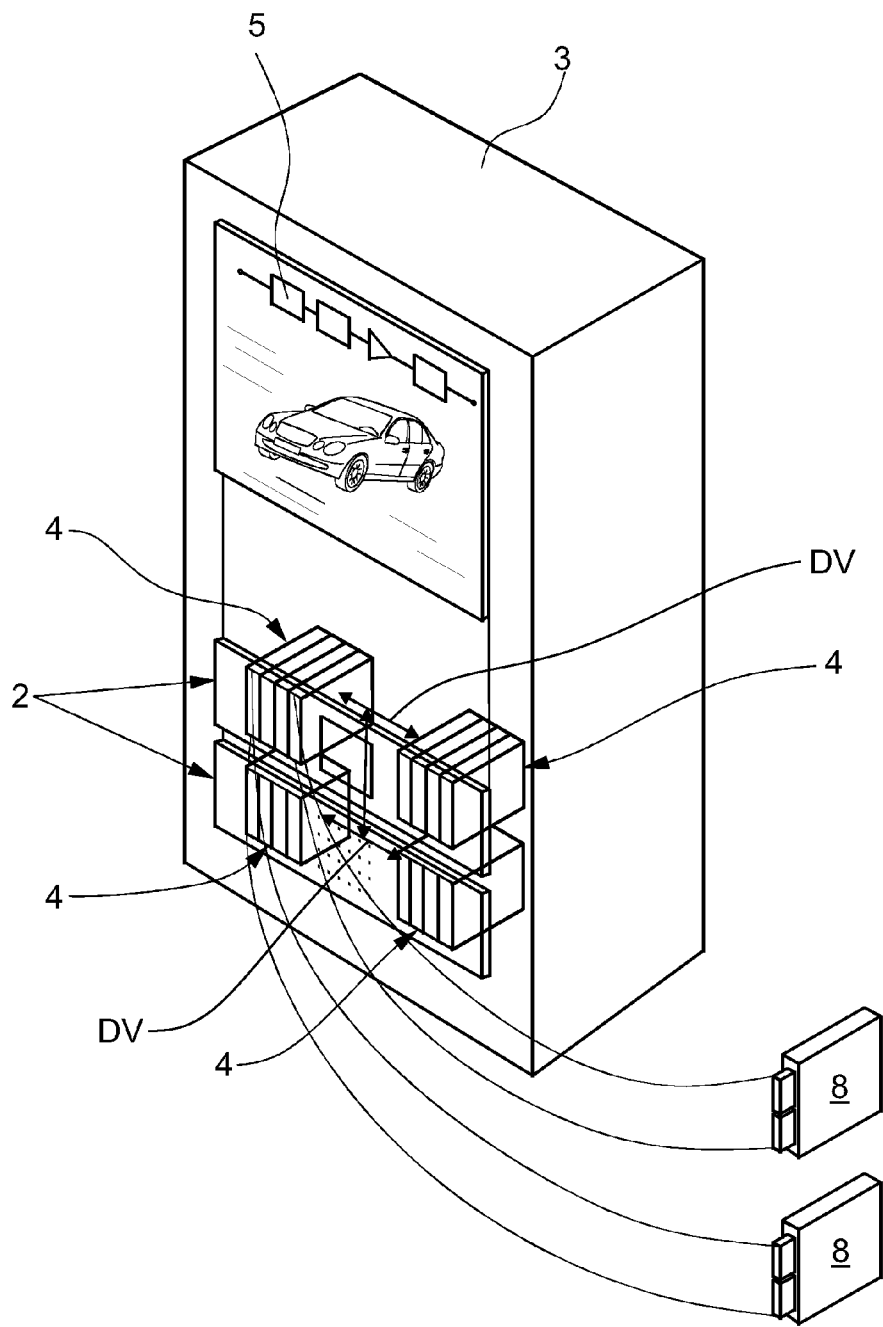
FIG. 1 is a schematic representation of an HIL simulator, with which a real-time simulation network is realized, wherein ECUs are connected to the HIL simulator.
Figure 2:
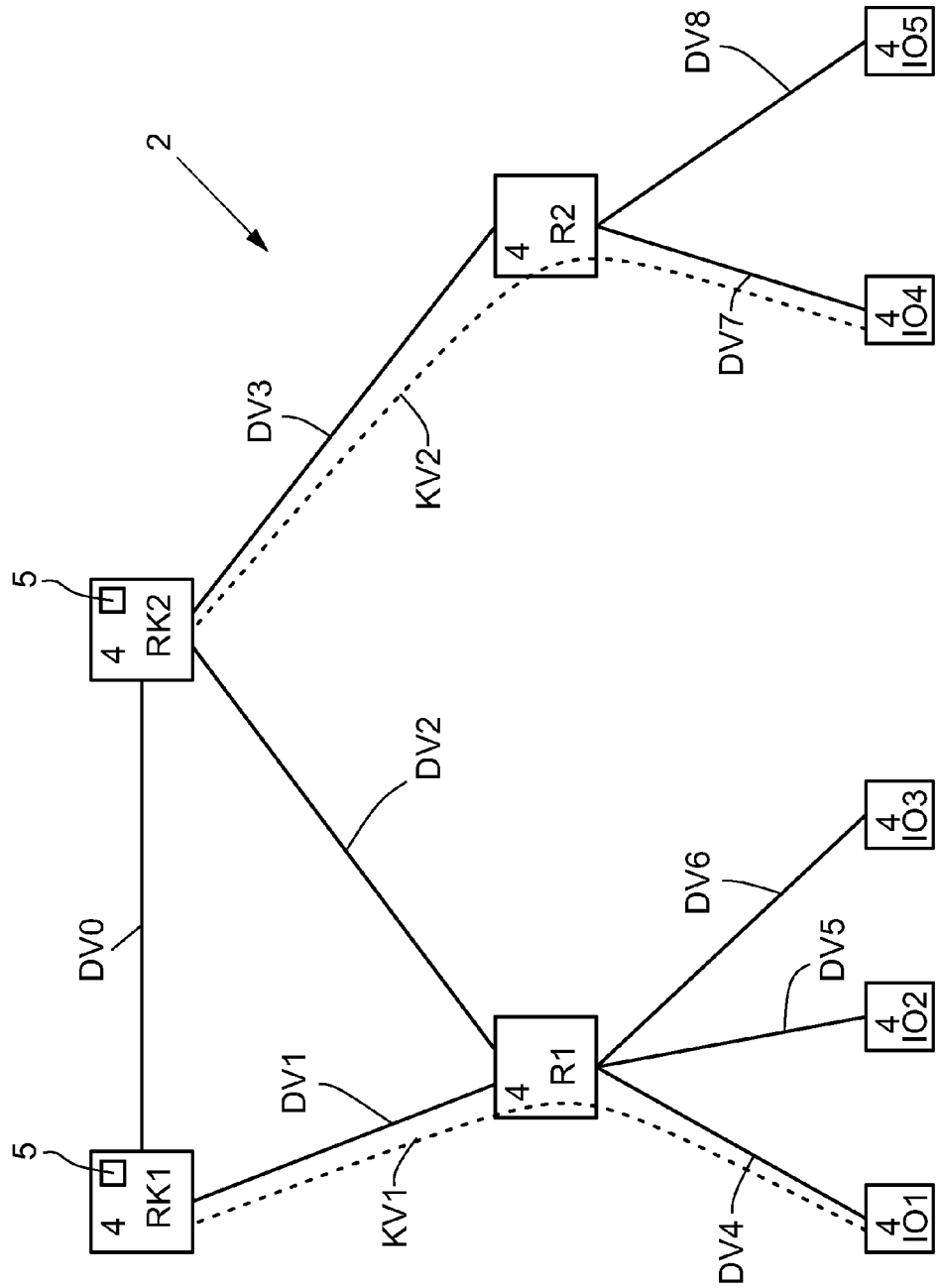
FIG. 2 is schematically a simulation network with different network nodes and with multiple data connections.

FIGS. 1 and 2 show typical situations in the development of controllers as known from the prior art. FIG. 1 shows a hardware-in-the-loop simulator 3, with which the specified distributed real-time simulation network 2 is implemented. The network nodes 4 of the simulation network 2 shown here, among other things, are plug-in cards of the HIL simulator 3. The network nodes 4 are at least partially interconnected via several data connections DV. For this purpose, each network node 4 has at least one data connection interface which serves to connect a data connection DV. The network nodes 4 are at least partially connected in communication KV via the data connections DV. A communication connection is therefore a path within the simulation network 2 via which two network nodes actually exchange information. During operation of the simulation network 2, a simulation application 5 is executed on at least one of the network nodes 4. In the exemplary embodiment shown, this is a technical-mathematical vehicle model.

The network nodes 4 have different functionalities. There are network nodes 4 which are executed as compute network nodes RK. They represent small computers on which a real-time operating system is executed. Other network nodes 4 realize communication network nodes R. They serve, for example, to serialize parallel data streams. Other network nodes 4 are in turn designed as I/O network nodes 10. They can be used to record measurement data from an external physical process or to send signals to influence the external physical process. In the example shown in FIG. 1, the external physical process is provided by two controllers 8. The controllers 8 are signal-technically connected to the simulation network 2, which is only subtly indicated in FIG. 1. During operation of the simulation network 2, the simulation network 2 interacts with the connected controllers 8. The controllers 8 are tested here for their functionality with the aid of the HIL simulator 3. The embodiment shown in FIG. 1 is only exemplary; completely different technical setups are possible.

In the figures, the various components of the displayed simulation networks 2 are labeled with the generic abbreviation already mentioned above (e.g., DV, RK, R, IO, etc.) and with a subsequent digit (e.g., DV1, RK2, R1, IO3). In the following, the designators for the different network nodes 4 of the simulation network 2 are partly used in the generic manner if the specific element of the simulation network 2 is not important. If a specific element is meant, e.g., a specific compute node in a shown simulation network, then, for example, the compute node RK2 will be meant and not merely any compute node RK.

FIG. 2 shows a simulation network 2 in somewhat more detail, even though the representation is only schematic. The simulation network 2 has two computational network nodes RK1, RK2, two communication network nodes R1, R2 in the form of routers, and five I/O network nodes IO1, IO2, IO3, IO4, IO5. The network nodes 4 are altogether connected to each other in a certain way via several data connections DV, i.e., the data connections DV0, DV1, . . . , DV8. Not every network node 4 is connected to every other network node 4, i.e., only selected data connections DV exist between the network nodes 4.

The network nodes 4 communicate with each other as a function of the concrete application, which is carried out with the simulation network 2, via certain communication connections KV, of which only two communication connections KV1, KV2 are shown here for the sake of clarity. In the exemplary embodiment shown in FIG. 2, the I/O network node IO1 sends measurement data via the communication network node R1 to the computational network node RK1. Likewise, the I/O network node IO4 sends measurement data via the communication network node R2 to the computational network node RK2. Thus, communication connections KV are those communication connections that are formed between actually communicating network nodes 4. They can therefore use several data connections DV.

When designing and implementing such simulation networks 2, the structure of the simulation network 2 must be chosen with great care so that the simulation network 2 does not reach its functional limits during operation. This may be the case, for example, if the data connections DV of the network nodes 4 are loaded in total with such high data transfer rates that they reach their channel capacity. Congestion can also occur if the delays in sending data packets between network nodes 4, so-called latencies, are greater than desired and also required.

With the computer-implemented methods 1 for restructuring U a predefined distributed real-time simulation network 2 shown in FIGS. 3 to 8, it is possible to systematically restructure a predefined real-time simulation network 2 in such a way that critical communication connections are automatically detected and at least reduced or even eliminated altogether.

Figure 3:
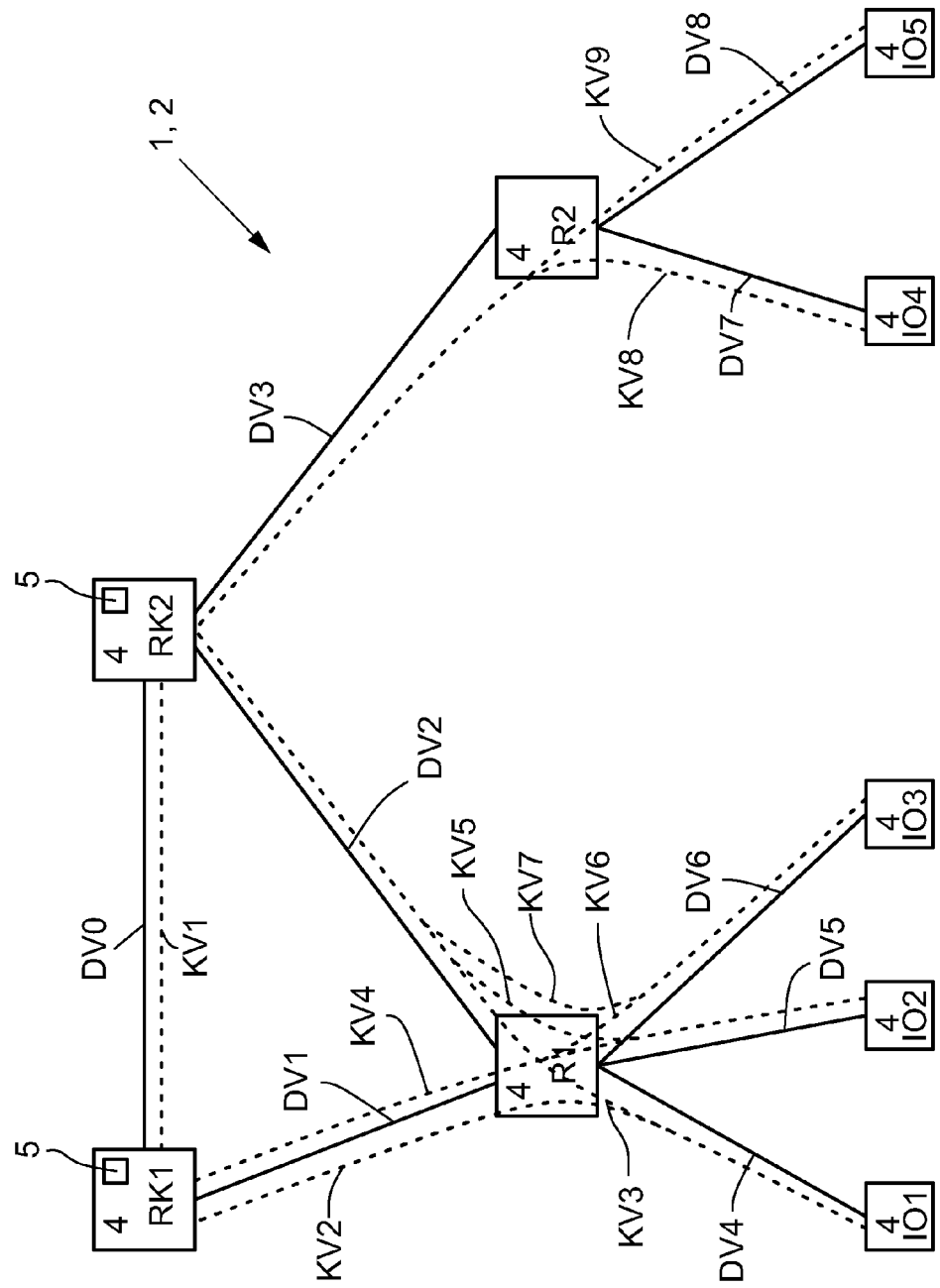
FIG. 3 is the simulation network from FIG. 2, which is examined and restructured according to a first variant of the method for restructuring the simulation network.
Figure 5:
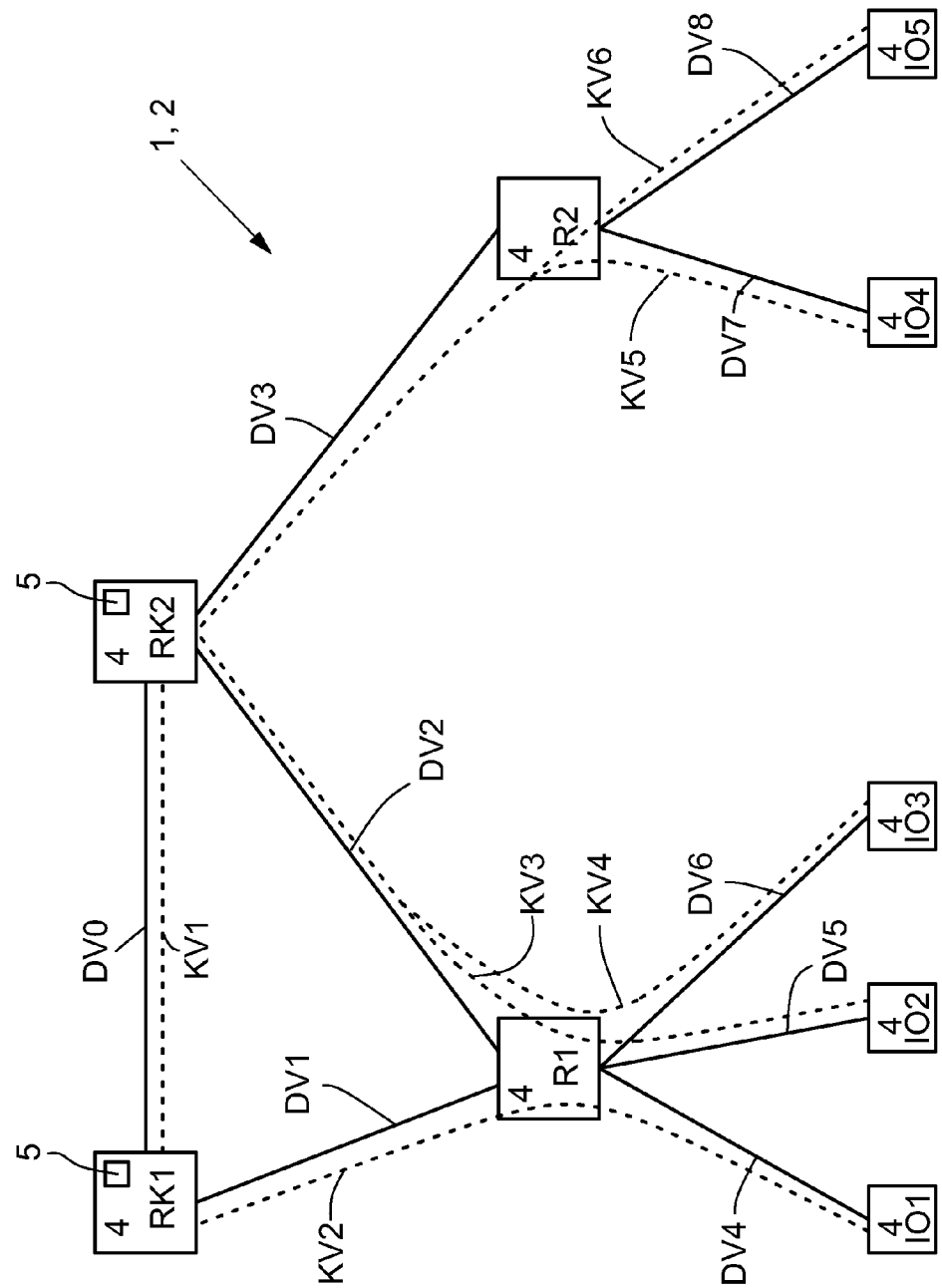
FIG. 5 is the simulation network according to FIG. 2, which is examined and restructured according to a second variant of the method for restructuring the simulation network.
Figure 7:
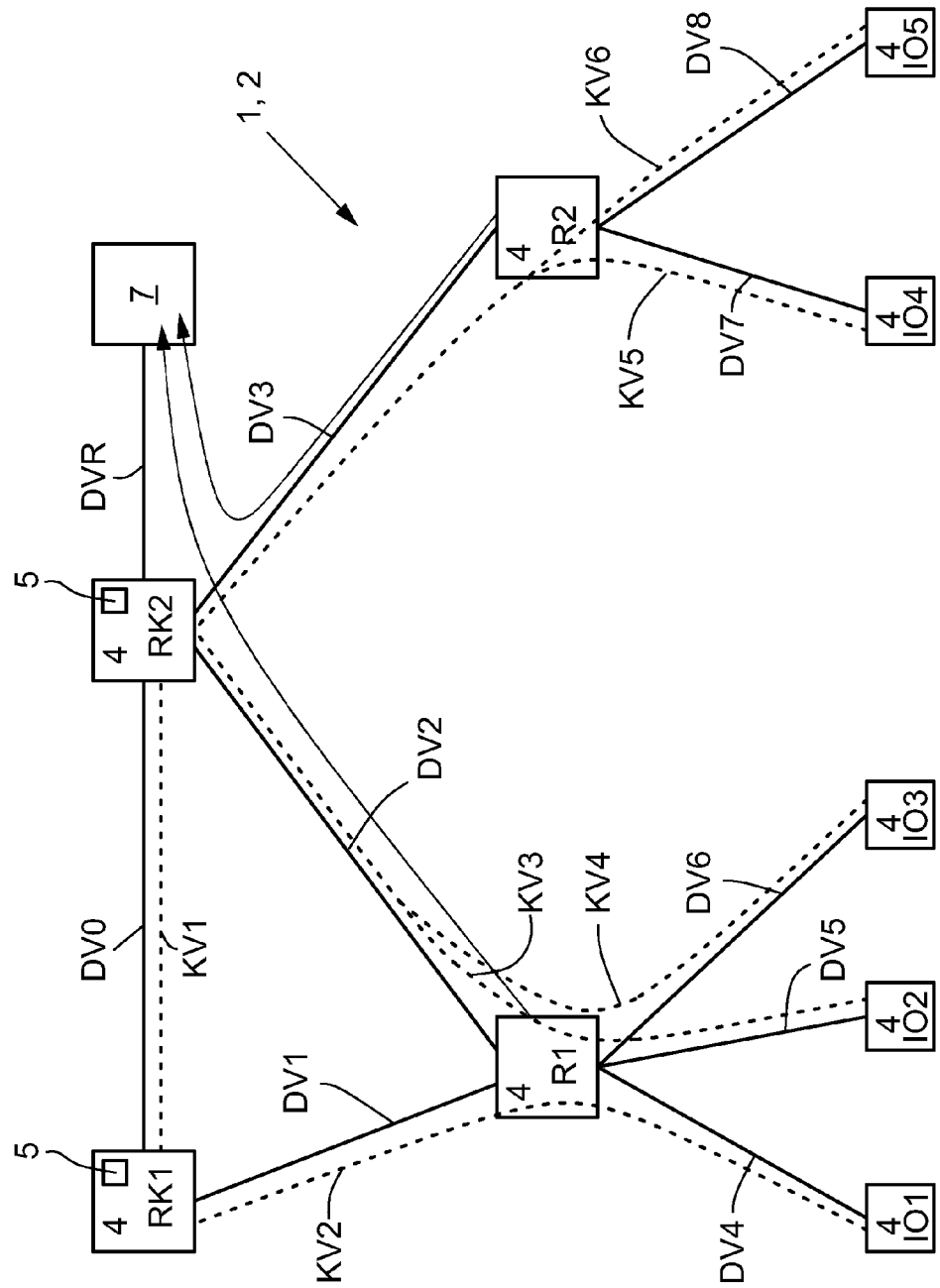
FIG. 7 is the simulation network according to FIG. 2, which is examined and restructured according to a third variant of the method for restructuring the simulation network.

FIGS. 3, 5 and 7 show simulation networks 2, respectively, each having identical components, i.e., identical network nodes 4 and identical data connections DV between the network nodes 4. The computational network nodes RK1, RK2 are each provided to run a simulation application 5. The simulation application 5 on the computational network nodes RK1, RK2 differ from each other in their function and together implement an overall application of the simulation network 2.

The three different variants of the method 1 for restructuring U the respective real-time simulation network 2 shown in FIGS. 3 and 4, FIGS. 5 and 6 and FIGS. 7 and 8 have the following method steps in common. First, the topology of the simulation network 2 is detected in each case, so that topology information 6 about the network nodes 4 and the data connections DV between the network nodes 4 is available. This is shown in the tables in FIGS. 4, 6 and 8, wherein the network nodes 4 are each fully included. The information concerning which network nodes 4 are connected to which data connections DV is not shown here in detail for the sake of clarity. In any case, the tables include the computational network nodes RK1, RK2, the communication network nodes R1, R2 and the I/O network nodes IO1, . . . , IO5. Also included are all data connections DV0 to DV8.

For the network nodes RK, R, IO of the simulation network 2, expected values E-KDR for the node data rates and expected values E-KL for the node latencies are determined. The node data rates are the data rates that can be generated, received, or transferred by the respective network nodes RK, R, IO. The node latencies are the time delays with which the network nodes RK, R, IO delay the transfer, reception, and delivery of data packets. Furthermore, expected values E-DVDR for the data transfer rates are determined for the data connections DV. The expected values for the aforementioned variables are shown in each case in the second, third, and fourth column of the displayed tables.

In addition, the communication connections KV between the network nodes of the simulation network are determined, i.e., the data paths over which the various network nodes 4 communicate from end to end. The communication connections KV are each indicated by dashed lines in FIGS. 3, 5 and 7. In the tables, the participating elements of the respective simulation network 2 are not listed separately again, but the communication connections KV as such are listed in a column of the respective tables.

For the communication connections KV, expected values for communication connection data rates E-KVDR and/or for communication connection latencies E-KVL are determined based on the expected values E-KDR for the node data rates and/or based on the expected values E-KL for the node latencies and/or for the expected values E-DVDR for the data transfer rates of the network nodes 4 and data connections DV involved in the respective communication connection KV. These determined expected values are listed in the respective columns for the communication connections KV.

For the communication connections KV, limit values for the communication connection data rates G-KVDR and/or limit values for the communication connection latencies G-KVL are determined, and for the data connections DV, limit values for the data transfer rates G-DVDR are determined. These limit values can be specified, for example, by the engineer responsible for designing the simulation network. However, they may also be default values from different design schemes. For example, relatively small limit values could be specified for a secure design scheme, whereas larger limit values are acceptable for a design scheme with maximum resource utilization.

At this point, it is not yet of interest specifically how accurately the different expected values and how accurately the different limit values are determined or chosen; what is important here is first of all that these values—or a selection of them—are determined or chosen or specified at all.

In an evaluation step BS, critical communication connections are then determined by comparing the determined expected values for the communication connection data rates E-KVDR and/or for the communication connection latencies E-KVL and/or for the data transfer rates E-DVDR with the limit values for the communication connection data rates G-KVDR and/or for the communication connection latencies G-KVL and/or for the data transfer rates G-DVDR of the respective communication connection KV or the respective or involved data connection DV. The limit values for the communication connection data rates G-KVDR and for the communication connection latencies G-KVL are also entered in the tables in the columns for the respective communication connection KV.

The result of the evaluation step BS is in each case symbolized in the tables either by a check mark, if the evaluation step has shown that the tested communication connection KV is not critical, i.e., that the limit values are not exceeded by the corresponding expected values, or by a lightning symbol, if the examined communication connection KV has turned out to be critical, i.e., an expected value exceeds the corresponding limit value. If critical communication connections KV have been detected, the components of the simulation network 2 involved in the critical communication connections can also be identified, as shown in the respective tables in the column labeled BS.

The three method variants shown also have in common that, in a restructuring step U, the predefined simulation network 2 is restructured in such a way that critical communication connections KV are reduced, ideally eliminated altogether. Corresponding restructuring measures are noted in the tables in the column labeled U and in the columns labeled U1 and U2.

After having explained the common features of the different variants of the method 1 for restructuring U a predefined distributed real-time simulation network 2, for the individual method variants, essentially only the characterizing features of the variants of the method 1 are discussed below.

The method 1 illustrated in FIGS. 3 and 4 is characterized by the fact that the expected values for the node data rates E-KDR and for the node latencies E-KL for the network nodes RK, R, IO of the simulation network 2 are determined on the basis of the hardware specifications of the network nodes RK, R, IO of the simulation network 2, especially without taking into account the simulation applications 5 of the computational network nodes RK1, RK2 and without taking into account other hardware parameterizations of the network nodes RK, R, IO. Since the simulation applications 5 of the computational network nodes RK1, RK2 and other hardware parameterizations of the network nodes RK, R and IO are not taken into account, it is not known which communication connections KV exist between the network nodes RK, R, IO; therefore, possible reasonable communication connections KV are assumed. Not considered to be useful are communication connections between I/O network nodes IO. The result is thus nine communication connections KV1, . . . , KV9, which are indicated as dashed lines in FIG. 3.

Since information concerning the simulation applications 5 and any hardware parameterizations of the network nodes RK, R, IO is not (cannot be) used, the maximum values for the node data rates and the node latencies are used here to determine the corresponding expected values. In the communication connections KV, the expected values for the data transfer rates E-DVDR of the data connections DV are determined by summing up the data transfer rates of the connected network nodes. For example, the I/O network nodes 101, 102 and 103 converge in the communication network node R1. In the worst case, all I/O network nodes IO1, IO2, IO3 communicate to the computational network node RK1 via the communication network node R1. For the data connection DV1, therefore, an expected value results for the data rate of 1.4 Gbps ("bps" in the following always denotes "bits per second") as the sum of the expected node data rates of the I/O network nodes IO1, IO2, IO3. The expected values for the node data rates E-KDR of the I/O network nodes IO1, IO2 and IO3 are, as already explained, maximum values. Therefore, a maximum value of 1.4 Gbps also results as an expected value for the communication connection data rate E-KVDR of the communication connection KV2.

The smallest channel capacity of the involved data connections is used as the limit value for the communication connection data rate G-KVDR of the communication connection KV2. Since all data connections involved have a channel capacity of 1.2 Gbps, this is also the limit value for the communication connection data rate of the communication connection KV2. The limit values for the data transfer rates G-DVDR of the data connections DV0 to DV8 are selected accordingly; they correspond to the respective channel capacities.

In the BS evaluation step, it is required that the expected value E-KVDR for the communication connection data rates must not exceed the limit value G-KVDR for the communication connection data rates. This condition is not met for the communication connection KV2. It is also not fulfilled for other communication connections, which, however, have been omitted from the table for the sake of clarity. In comparing the expected values E-DVDR for the data transfer rates of the involved data connections with the limit values G-DVDR for the data transfer rates of the involved data connections, it becomes clear that the reason for the critical rating of the communication connection KV2 is the data connection DV1. The restructuring step U1 for eliminating the critical communication connection KV2 includes the fact that the data connection DV1 is functionally extended by replacing it with a data connection, which has more than twice the channel capacity of 2.5 Gbps. The same applies to the data connection DV2, which is not discussed in detail here.

As a second restructuring measure U2, it is proposed to reduce the functionality of the I/O network nodes IO2 and IO3, namely by throttling the maximum permitted data rate to 400 Mbps in each case. This measure also does not require any change in the topology of the simulation network 2 shown in FIG. 3.

FIGS. 5 and 6 show a second variant of method 1 for restructuring U a predefined distributed real-time simulation network 2. This second variant of method 1 is characterized in that the expected values for the node data rates E-KDR and/or the node latencies E-KL for the network nodes RK, R, IO of the simulation network 2 are determined taking into account the simulation applications 5 of the respective network nodes and also taking into account any hardware parameterizations of the network nodes RK, R, IO. The consideration of this information allows for a much more accurate estimation of the different expected values since there are now clues about the generation rates of data and thus about the data volume on the data connections DV. At the same time, it is also known who the sender is, and who the receiver of data packets is, so that the communication connections KV can also be accurately determined.

The simulation network shown in FIG. 5 is structurally identical to the simulation network shown in FIG. 3, but due to the different procedures used, the difference between the data in the overview table in FIG. 4 and the overview table in FIG. 6 is quite considerable. In some cases, other specifications have also been made, so that the examples are not readily comparable. The exemplary embodiments should therefore be viewed separately. The topology information 6 is basically comparable to the exemplary embodiment discussed above. However, there are considerably fewer communication connections KV, namely a total of only six communication connections KV1 to KV6. For space reasons, the communication connection KV4 is not shown in the table.

When considering the simulation applications 5, it is particularly provided that the expected values for the node data rates E-KDR and/or for the node latencies E-KL are determined taking into account the calculation interval TS of periodic tasks and the assumed call rates and processing times of aperiodic tasks. Also taken into account is the size of calculated and sent data packets in tasks of simulation applications 5, the configuration of I/O functions of I/O network nodes IO and the call rate and size of processed I/O data packets. As a result, it can be seen that considerably smaller expected values for the node data rates E-KDR and also for the data transfer rates E-DVDR arise, since the affected network nodes RK, R, IO are in fact not fully utilized. The expected values for the data transfer rates E-DVDR of the data connections DV are determined in a similar way, as described in FIGS. 3 and 4, i.e., by considering the expected values for the node data rates E-KDR, with which the participating network nodes 4 feed into the participating data connection DV. The expected values for the communication connection latencies E-KVDR are also determined by summing up the latencies of the participating network nodes 4.

On the basis of the data determined in this way, a critical communication connection KV3 is determined. Here, the expected value E-KVDR for the communication connection data rate is somewhat larger than the corresponding limit value G-KVDR for the communication connection data rate. A solution option offered here—and if necessary also automatically implemented—is to reduce the node data rates of the I/O network nodes IO2 and IO3 by 25% each, namely by setting the analog/digital conversion performed by the I/O network nodes to a lower resolution, namely from 16 bit to 12 bit (see corresponding entry in column U1). This measure does not entail any structural change in the topology of the simulation network 2.

Another proposed restructuring U2 is that the I/O network node IO3 is not connected to the computational network node RK 2 via the communication network node R1, but rather via a rerouted data connection DV6, which connects the I/O network node IO3 to the communication network node R2. The resulting additional data transfer rate on the data connection DV3 does not lead to an unacceptable load on the data connection DV3; the limit values G-KVDR for the corresponding communication connection data rates are still far from being reached.

FIGS. 7 and 8 show another, third variant of the computer-implemented method 1 for restructuring U a predefined distributed real-time simulation network 2. The simulation network shown in FIG. 7 corresponds practically entirely to the simulation network 2 shown in FIG. 5, including the simulation applications 5 executed on the computational network nodes RK1, RK2. However, a computer 7 is additionally shown here, on which the method 1 is implemented programmatically. The computer 7 is connected to the simulation network 2 via a data connection DVR. In the simulation networks 2 shown in FIGS. 3 and 5, the method 1 could also be executed on a computer 7 as shown in FIG. 7. The computer 7 is not shown in the other figures so as not to unnecessarily complicate the illustrations.

The variant of method 1 discussed in FIGS. 7 and 8 is characterized by the fact that the expected values for the node data rates E-KDR and for the node latencies E-KL for the network nodes RK, R, IO are determined by measurements in the simulation network 2. The expected values for the data transfer rates of the data connections E-DVDR are determined arithmetically from the expected values mentioned above—as previously explained. They are therefore also based on the measurements that are carried out.

In the present case, the measurements are carried out during operation of the simulation network 2. This offers the advantage that effects like data collisions on the data connections DV or the communication connections KV are also taken into account, which lead to an overall delay in data transfer and also to increased data volume, since data packets may have to be sent several times. This provides a particularly realistic estimate of the simulation network 2 load.

The expected values for the communication connection data rates E-KVDR and the expected values for the communication connection latencies E-KVL are also determined by measurements, in this case by measuring during operation of simulation network 2. The fact that the expected values are also measured for the communication connections can be seen in the table in FIG. 8 in that the expected values with respect to the communication connection KV do not always result from the summed up expected values of the nodes involved.

The expected values for the communication connection latencies E-KVL are measured by setting up a synchronous time for all network nodes RK, R, IO of the simulation network 2, in that each sending network node RK, R, IO assigns a dispatch time stamp to the data item or data packet it sends, and in that the last receiving network node RK, R calculates the expected value for the communication connection latency E-KVL of the corresponding communication connection KV2 from the time of receipt identified by it and evaluates the dispatch time stamp, in this case, for the reasons already mentioned, during the operation of the simulation network 2, i.e., during the execution of the simulation applications on the computational network nodes RK1, RK2. In the present case, the deviations between the determined expected values according to FIG. 5 and the measured expected values according to FIG. 7 are relatively small, so that the same critical communication connections KV are determined, which can also be eliminated with the same measures.

To measure the expected values for the communication connection data rates E-KVDR, the communication network nodes R1, R2 are each equipped with a monitoring application that statistically records the data throughput and then sends corresponding information for evaluation to the computer 7, where corresponding expected values can be determined by evaluating the statistics. The advantage of this solution is that no additional infrastructure is required, but it must be taken into account that, depending on the type of realization, the versions of the monitoring applications may have an—albeit smaller—influence on the real-time data transfer.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for restructuring a predefined distributed real-time simulation network, the method comprising:
providing the simulation network with a plurality of network nodes and a plurality of data connections, wherein each network node has at least one data connection interface for connecting a data connection with the network nodes to be at least partially in a communication connection via the data connections; and
executing, during operation of the simulation network, a simulation application on at least one network node;
detecting a topology of the simulation network so that topology information concerning the network nodes and the data connections between the network nodes is available;
determining expected values for one or both of node data rates and node latencies for the network nodes of the simulation network;
determining expected values for data transfer rates for the data connections;
determining communication connections between the network nodes of the simulation network;
determining, for the communication connections, expected values for one or both of communication connection data rates and communication connection data rates based on any combination of the expected values for the node data rates, the node latencies, and the data transfer rates of the network nodes and data connections involved in the communication connection;
determining, for the communication connections, limit values for one or both of the communication connection data rates and the communication connection latencies;
determining, for the data connections, limit values for the data transfer rates;
determining in an evaluation step, one or more critical communication connections, a communication connection being determined to be critical when the determined expected values for the communication connection data rates of that communication connection is greater than the limit value for the communication connection data rate of that communication connection, or an expected value of a latency of that communication connection is less than a limit value of the latency of that communication connection, or an expected value of the data transfer rate of that communication connection is greater than the limit value of the data transfer rate of that communication connection, or any combination thereof are compared with the limit values for the communication connection data rates and I or communication connection latencies and/or data transfer rates of the relevant communication connection; and
restructuring, in a restructuring step, the predetermined simulation network such that the critical communication connections are reduced,
wherein a number of the plurality of network nodes are configurable, or a number of plurality of the plurality of data connections are configurable, or both.

2. The method according to claim 1,
wherein the topology of the simulation network is obtained by calling up information services implemented on the network nodes of the simulation network, which, when called, provide information concerning to which network nodes they are directly connected or provide information concerning the data connection via which they are directly connected to the network nodes, or
wherein the topology of the simulation network is obtained by reading in the data file with the topology information of the predefined simulation network.

3. The method according to claim 1,
wherein, in the restructuring step, the critical communication connections in the predetermined simulation network are reduced,
wherein the topology of the simulation network is maintained, and
wherein the predefined simulation network, at least in part, while retaining the topology of the simulation network, the network nodes are a first network node is functionally extended, a second network node is functionally reduced, and/or the data connections are a first data connection is functionally extended, a second data connection is functionally reduced, the communication connections between network nodes are routed differently, or any combination thereof
wherein the predefined simulation network is at least in part, while modifying the topology of the simulation network, extended by at least one additional network node and by at least one additional data connection and/or reduced by at least one existing network node and by at least one existing data connection.

4. The method according to claim 1, wherein the expected values for the data transfer rates of the data connections are obtained by summing up the data rates of the connected network nodes.

5. The method according to claim 1, wherein the channel capacities of the data connections are used as limit values for the data transfer rates of the data connections.

6. The method according to claim 1, wherein the expected values for one or both of the node data rates and the node latencies for the network nodes of the simulation network are determined on the basis of the hardware specifications of the network nodes of the simulation network without taking into account one or both of the simulation applications of the respective network node or without taking into account and the hardware specifications of the network nodes.

7. The method according to claim 1, wherein worst-case expected values for one or both of the node data rates and the node latencies for the network nodes of the simulation network are determined by using any, combination of maximum values of the node data rates, the node latencies for the expected values for the node data rates, and the node latencies.

8. The method according to claim 1,
wherein mean values for one or both of actual node data rates and node latencies for the network nodes of the simulation network are calculated from a plurality of real-time simulation networks configured to operate, and
wherein these mean values are selected as the expected values for one or both of the node data rates and the node latencies for the network nodes of the simulation network.

9. The method according to claim 1, wherein the expected values for one or both of the node data rates and the node latencies for the network nodes of the simulation network are determined by taking into account one or both of simulation applications of the respective network nodes and or by taking into account any hardware parameterizations of the network nodes.

10. The method according to claim 9, wherein the expected values for one or both of the node data rates and the node latencies for the network nodes are determined taking into account the calculation interval of periodic tasks or assumed call rates or both and processing periods of external tasks, the size of calculated and sent data packets in tasks, the configuration of I/O-functions, the call rate and the size of processed I/O data packets.

11. The method according to claim 1, wherein the expected values for one or more of the node data rates, the node latencies for the network nodes, and the expected values for the data transfer rates of the data connections of the simulation network are determined by measurements in the simulation network.

12. The method according to claim 1, wherein the expected values for one or both of the communication connections data rates and communication connection latencies are determined by measurements during operation of the simulation network.

13. The method according to claim 12,
wherein the expected values for the communication connection latencies are measured by setting a synchronous time for all network nodes of the simulation network,
wherein each sending network node assigns a dispatch time stamp to the data item it sends, and
wherein the last receiving network node determines the expected value for the communication connection latency of the corresponding communication connection from the time of receipt identified by it and evaluates the dispatch time stamp during the operation of the simulation network or during execution of the simulation applications on the network nodes.

14. The method according to claim 12,
wherein the expected values for the communication connection latencies are measured by setting a synchronous time for all network nodes of the simulation network,
wherein an echo function in the network nodes of the simulation network is implemented, and
wherein the network node receiving during operation of the simulation network or the sending network node of a communication connection sends an echo request to the network node respectively sending during operation of the simulation network or to the receiving network node of this same communication connection, and
wherein the network node sends the echo request determining the echo round-trip time after receiving the echo signal and determines the expected value for the communication connection latency therefrom, and
wherein the simulation network is not operated during the echo process or the simulation applications are not executed on the network nodes.

15. The method according to claim 1,
wherein the method is executed on a computer which is connected to the simulation network via a data connection or
wherein the method is executed on a network node of the simulation network designed as a computational network node.

16. A computer program product comprising commands which, when the program is executed by a computer, cause the computer to perform the method according to claim 1.

17. A computer-readable storage medium comprising commands which, when the program is executed by a computer, cause the computer to perform the method according to claim 1.

18. The method according to claim 1,
wherein, in the restructuring step, the critical communication connections in the predetermined simulation network are reduced,
wherein the topology of the simulation is modified, and
wherein the predefined simulation network is extended by at least one additional network node, extended by at least one additional data connection, reduced by at least one existing network node, reduced by at least one existing data connection, or any combination thereof.

* * * * *